US007846519B2

(12) United States Patent
Outreman

(10) Patent No.: US 7,846,519 B2
(45) Date of Patent: Dec. 7, 2010

(54) HEAT RESISTANT PLASTIC CONTAINER

(75) Inventor: Jean-Tristan Outreman, St Maximin la Ste Baume (FR)

(73) Assignee: Tecsor HR (FR)

( * ) Notice: Subject to any disclaimer, the term of this patent is extended or adjusted under 35 U.S.C. 154(b) by 0 days.

(21) Appl. No.: 12/718,014

(22) Filed: Mar. 5, 2010

(65) Prior Publication Data

US 2010/0181281 A1 Jul. 22, 2010

Related U.S. Application Data

(63) Continuation of application No. 11/917,936, filed as application No. PCT/FR2006/001408 on Jun. 21, 2006, now Pat. No. 7,735,300.

(30) Foreign Application Priority Data

Jun. 21, 2005 (FR) .................................. 05 06239

(51) Int. Cl.
*B29D 22/00* (2006.01)
*B29D 23/00* (2006.01)
*B32B 1/08* (2006.01)

(52) U.S. Cl. ...................... 428/35.7; 428/480; 215/381; 220/609

(58) Field of Classification Search ................ 428/35.7, 428/480; 215/381; 220/609
See application file for complete search history.

(56) References Cited

U.S. PATENT DOCUMENTS

2002/0004090 A1 1/2002 Lafleur
2002/0020149 A1 2/2002 Silvers et al.

FOREIGN PATENT DOCUMENTS

DE 195 20 925 A1 12/1996
FR 2 772 365 A1 6/1999

*Primary Examiner*—Michael C Miggins
(74) *Attorney, Agent, or Firm*—Mario A. Tabone; Plastipak Packaging, Inc.

(57) ABSTRACT

A lightweight, thin-walled heat resistant plastic container containing hot-filled liquid contents, comprising: a spout for filling the container with liquid contents; a closure configured to seal the spout; a base including a bottom portion that is bent toward the spout, the base including a structural reinforcement configured to withstand hydrostatic pressure from the hot-filling of liquid and configured to prevent significant deformation in the base upon the cooling of the hot liquid; and a sidewall extending upwardly from the base toward the spout, the sidewall including a zone of deformation, wherein the zone of deformation in the sidewall is configured to accommodate an initial deformation due to the cooling of the contents and to substantially regain its initial shape upon the relieving of immobilized stresses.

15 Claims, 1 Drawing Sheet

HEAT RESISTANT PLASTIC CONTAINER

CROSS-REFERENCE TO RELATED APPLICATIONS

This application is a continuation of application Ser. No. 11/917,936, filed Dec. 18, 2007, now pending, which claims priority to International Application No. PCT/FR2006/001408, filed Jun. 21, 2006, which claims priority to French Application No. 0506239, filed Jun. 21, 2005, and issued on Sep. 28, 2007, the entire contents of which are herein incorporated by reference.

TECHNICAL FIELD

This invention relates to a process for hot filling a light, thin-walled container, in particular made of polyethylene, and a filled container that is thus obtained.

BACKGROUND

A polymer, polyethylene terephthalate, PET, heavily used for the production of containers for liquids, is known. Its primary assets are transparency, low weight, release of forms allowing distinctive profiles based on commercial products or requirements, contrary to metal boxes, all of the same shape and same dimensions. It is the same for the containers that are produced from cardboard whose forms are limited. PET is unbreakable and has good mechanical properties of preservation and permeability, which makes it very attractive and explains for the most part its very heavy use.

These bottles made of PET are used for still liquids such as oils and mineral waters. In this case, the containers undergo only very few mechanical stresses. The PET is completely suitable. Actually, these liquids are cold filled without pressure.

These bottles are also used in the case of carbonated drinks and are therefore likely to pressurize the container. Tricks of design with grooves on the body of the bottle or so-called petaloid bottoms make it possible to enhance mechanical strength and/or resistance to pressure, without increasing the weight of the container in a detrimental way.

When the manufacturers need to hot fill a container, it then is necessary to use different designs that require larger thicknesses, different geometries including panels placed on the body of the container to produce beams. These elements that are necessary for hot filling lead to high weights with high material consumptions, up to two times the weight of the same bottle for cold-filled liquids.

Actually, the mechanical characteristics of the PET deteriorate greatly when the temperature rises. There are so-called "heat-resistant" processes, more commonly designated by the letters HR, which make it possible to improve the heat resistance of the container that is thereby produced. A first so-called one-wheel process makes it possible to reach filling temperatures of 80/88° C. A second so-called two-wheel process makes it possible to package the liquids at temperatures of 88/95° C.

A hot-filled bottle actually undergoes numerous mechanical stresses during different phases. Thus, the bottom is to withstand the hydrostatic pressure of the hot liquid during filling. The container is to withstand forces produced by the evacuation caused by the cooling of the liquid when the container has been plugged when hot to ensure the sterile nature of the liquid. The cooling causes a double contraction, that of the liquid and that of the air of the top space of said bottle. It is for this reason that the profiles are much more complex with panels and beams on the body, bands marked on the body as well as a shoulder between the spout and the body, whose shape is rather bulbous. The advantage of the thickness that is necessary to the mechanical strength is also having a higher inertia at the temperature.

The manufacture of light bottles made of PET uses the so-called extrusion/blow molding process. This process consists in making a preform by extrusion, whereby this preform has a tube profile with one end formed to dimension and to the definitive form of the spout, and whereby the other end is closed. After heating this preform, in particular by infrared radiation, up to 100/120° C., the amorphous material is softened and can undergo blowing through the interior after it has been placed in a suitable mold. This mold has dimensions such that the withdrawal of the material with cooling is taken into account so that the final container has the desired dimensions.

During this blow-molding phase, a longitudinal stretching occurs under the action of a stretching rod and inflation by the pressurized air that is thus introduced. More precisely, the air is first introduced at low pressure to ensure a suitable deformation of the material during high amplitudes then at high pressure to ensure plating against the walls of the mold during finishing and for very low amplitudes. The molds are also cooled with water so as to dissipate the calories transmitted by contact, which also has the effect of immobilizing the bottle.

Actually, the bottles that are thus obtained are called bi-oriented because they have undergone stretching in one direction and an omni-directional inflation. The macromolecular chains that are thus oriented in two directions lead to excellent parameters of mechanical strength, at ambient temperature. The drawback of this bi-orientation is being in part reversible, and the material thus regains a certain freedom as soon as the temperature rises. Actually, the material has a tendency to return to its initial form in which it has fewer stresses. It is the so-called shape memory phenomenon.

For the thick bottles that are designed to be used for hot-filled drinks, use is also made of extrusion/blow molding, but with more sophisticated and more complex behavior parameters. Actually, the preform is heated to a higher temperature than in the case of light containers, close to the crystallization so as to reduce this PET shape memory and to relieve the stresses due to the blow molding.

In the case of manufacture with one wheel, so as to increase its strength at temperature, the initially amorphous material of this container is made to undergo a heat treatment, during and after its shaping. The material, when it is stretched after softening, generates an induced, but reversible, crystallinity, whereby the material remains transparent. The mechanical properties are enhanced. Thus, if the heating is maintained after having generated this induced crystallization, a spherulitic crystallization occurs, causing a certain crystallinity of chains that are already organized by bi-orientation. Contrary to the direct spherulitic crystallization of the PET, the spherulitic crystallization subsequent to a bi-orientation perfectly preserves the transparency of the material.

In the case of two-wheel manufacture, the process makes it possible to reach higher performance levels, but at the cost of a succession of more complex stages. Actually, in this case, a blank of much larger volume than the volume of the final container, two to three times as much, i.e., with a proportional stretching rate, is first worked up. This blank is then heated beyond the vitreous transition to relieve the stresses, which brings about a reduction of volume and a return to the dimensions of the preform, but with a high rate of spherulitic crystallinity, whereby this leads in a proportional way to a homothetic container. There is self-regulation with the PET.

When this restricted blank is at temperature, a blowing stage with a mold with the dimensions of the final container to be obtained, aside from recesses, makes it possible to manufacture the final container. The high rate of crystallinity imparts to this container an improved resistance to hot filling. It is noted that such a process is much more burdensome to put into place. The process requires behavior always at the limits of values, requires cleaning of molds, as well as intensive and regular maintenance.

In addition, it should be noted that the bottles that are obtained by the HR process have a tendency to absorb water as soon as they are manufactured, which reduces their characteristics of mechanical strength and therefore temperature resistance. It thus is possible to obtain manufacture of a container that initially withstands a temperature of 88° C. and that, after uptake of water, withstands only 82° C. Actually, the transition temperature TG drops.

Whereby storage should be reduced as much as possible, the bottles are generally produced on the filling site, for just-in-time use, which is another constraint. Once these containers are manufactured, there are several filling methods and various properties of the liquids to be packaged. There are liquids that are sensitive to light, such as milk or beer, sensitive to oxygen absorption and therefore oxido-sensitive, such as fruit or vegetable juices, beer, oil, but also sensitive to the uptake of water, to the loss of gas, to the development of yeast, mold or bacteria. The liquids can include preservatives and are thereby not very sensitive; in contrast, certain so-called still and delicate liquids—such as milks, juices, coffee, tea, fruit drinks, and certain waters—do not include any preservative and should still be packaged under the best conditions.

To ensure such packaging under conditions of suitable hygiene and with all of the guarantees of good preservation, two primary methods are known: one called "aseptic filling," and the other called "hot filling." The aseptic filling is simple in theory because it consists in filling the container with a sterilized liquid and in plugging said container, whereby the packages just like the plugs are sterilized, and the operation is conducted in a sterile environment in its entirety. Nevertheless, it is understood that the chain is complex to install, difficult to keep always under the same aseptic conditions over time, require a very high monitoring and high maintenance producing high costs. In such a chain, it is necessary to use chemical sterilizations that use chemical products with treatments that are derived therefrom, expertise of personnel, and low yield due to treatment speeds that are not very high. The yield is 40 to 50% of that of a hot filling chain. The investments are also very large, two to three times larger than that of a hot filling chain.

A very significant drawback of this process resides in the impossibility of monitoring online the sterility of the contents in each container. At the very most, the monitoring can be done by sampling. The advantage of this cold aseptic filling is to require only thin-walled bottles of low weight and of free form since the cold filling prevents the deformations due to the temperature.

The other method, hot filling, also guarantees a quality of asepsis, since the monitoring of the temperature of the contents is simple and easy at any time. The bottling line is simple, and the treatments of the container and the plug are limited in scope since the sterilization is obtained by the hot liquid itself, introduced into the container that is immediately closed after filling. A tipping of the bottle also ensures the sterilization of the inside surface of the plug in contact with the liquid. In contrast, it is necessary to use containers that are able to withstand the filling temperature of between 60 and 95° C., more particularly between 80 and 92° C., based on the products. In addition, the bottles have high weights with approximately identical shapes linked to the resistance constraints, which allows only a very slight differentiation between the marketed products.

Also, it is concluded that there are two processes that have advantages and disadvantages. Nevertheless, the additional expense produced by the particular characteristics of the containers currently used and necessary for hot filling tend to orient the manufacturers involved toward the activation of filling lines by the aseptic method.

It is important to set an estimate of the material weight. Fifteen years previously, a 1.5 liter container required 49 g of cold filling material and 55 g of hot filling material, HR treatment. Since then, important gains have been made for the cold filling reaching 28 g, while the amount of material for hot filling has stayed almost the same.

The compromise sought by the manufacturers would consist in being able to fill hot liquids to obtain the guarantee of asepsis but in thin-walled bottles that are designed for cold filling to limit the costs of the containers as well as the packaging line. This is what the process according to this invention proposes, which is now described in detail according to a preferred, nonlimiting embodiment.

SUMMARY

A lightweight, thin-walled heat resistant plastic container containing hot-filled liquid contents is provided. The container comprises a spout for filling the container with liquid contents, a closure configured to seal the spout, a base, and a sidewall extending upwardly from the base toward the spout. The base includes a bottom portion that is bent toward the spout, and a structural reinforcement configured to withstand hydrostatic pressure from the hot-filling of liquid, which is configured to prevent significant deformation in the base upon the cooling of the hot liquid. The sidewall includes a zone of deformation, which is configured to accommodate an initial deformation due to the cooling of the contents and to substantially regain its initial shape upon the relieving of immobilized stresses.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

The given example relates to the PET bottles but could be applied to any container made of polymer material of the same nature and having similar properties. The process consists in carrying out hot filling of a thin-walled container, whereby this container should have suitable characteristics as described above.

This container is cylindrical in shape, optionally with grooves for making the body rigid, with a light bottom like that of the containers for still mineral waters, but reinforced, whereby the total weight of the container is approximately that of the containers that are used for the mineral water containers, with equal capacity. The reinforced bottom generally consists of a bottom that is bent toward the spout with reinforcements to prevent its return under slight pressure.

Figure 1:
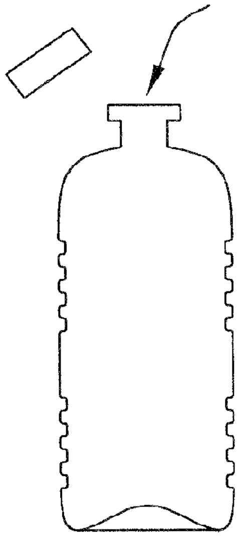
FIG. 1 is a side view of a plastic container according to an embodiment of the invention prior to being filled.

This container is manufactured starting from one or the other of the two so-called one- or two-wheel "HR" treatment methods, based on the packaging temperatures. The container thus has good hot strength and still has a reduced weight. In addition, the absence of the characteristic elements of the PET bottles of the prior art that were hot packaged, such as a band, a bulb with a shoulder, panels, is noted. The container, shown in FIG. 1, uses a simple geometry.

The filling is carried out from the reservoir of a filling device of known type, generally by gravity directly into the container, whereby the liquid is carried and kept at a temperature of 60° to 95° C. based on the targeted applications. When the liquid at temperature penetrates the container, three actions occur:

- Quick rise in temperature of the wall since the thickness is slight and the corresponding inertia is limited.
- Action of the hydrostatic pressure due to the load resulting from the gravity flow, and
- Action due to the load of the liquid volume introduced into the container.

Figure 2:
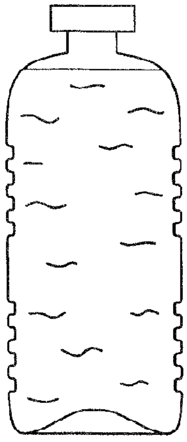
FIG. 2 is a side view of the same plastic container at the time the container is closed after being filled.
Figure 4:
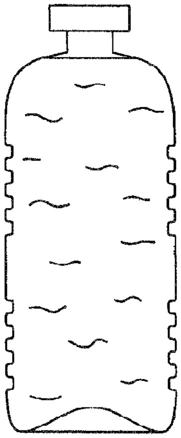
FIG. 4 is a side view of a plastic container, such as shown in FIG. 3A and FIG. 3B, after pressurization.

The container deforms little under the effect of the rise in temperature under the filling effect, because the container is manufactured to meet this rise in temperature, at the very most a very slight barrel shaping at the time it is closed. This is the representation of FIG. 2.

It is known that the crystallinity can be improved as indicated in the introductory clause of this application, which greatly improves the mechanical strength. It is also known that if the container is used after its manufacture, the uptake of moisture is very limited, and the initial temperature resistance remains almost unchanged.

The bottom having been designed with an improved mechanical strength as well as its "HR treatment" prevents the restoration of the bulge of this bottom under the effect of the load and the increase in pressure once said container is closed. Actually, the increase in temperature brings about a quick shrinkage of the volume of the container while the liquid that is contained preserves its volume, which generates pressurization of the interior of the container.

Actually, the bottom that is designed to withstand preserves its shape while the body of the container has a significant deformation during the cooling of the liquid and the head space. It should be noted that this deformation is not irreversible, since if the container is open, the body regains its initial shape. It is known that the deformation is located in the zone that is the most favorable to the mechanical deformation such as the walls, for example, in the case of known containers and for which no particular modification has been provided.

It is also noted that in the case of a zone that is less resistant mechanically, the deformation can be reproduced on all of the identical containers that are filled under the same conditions. It is therefore possible to create a zone voluntarily that is suitable in any container so as to carry the deformation to this specific and determined zone in a reproducible way.

Figure 3A:
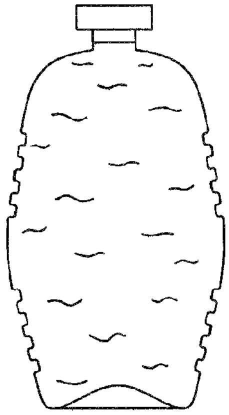
FIG. 3A is a side view of a plastic container according to an embodiment of the invention, showing outward deformation brought about by post-fill cooling.
Figure 3B:
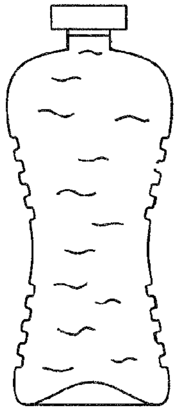
FIG. 3B is a side view of a plastic container according to another embodiment of the invention, showing inward deformation brought about by post-fill cooling.

It is known that a square or cylindrical container withstands pressure well but withstands vacuum poorly except in providing devices such as grooves or folds. According to the process of the invention, a container is therefore obtained with a bottom and a band for joining the bottom and said non-deformed body thanks to the strength of the fold formed at this junction. The container is stable on its bottom but with a deformed body, collapsed as it is referred to in the trade, which makes it unsuitable for sale. These are the representations of FIGS. 3A and 3B.

The process according to this invention consists in reducing the volume of the container by bringing about a reduction of the volume of the container after partial or total cooling of the liquid. It was noted that the bottle, even if it receives a "Heat Resistance" (HR) treatment, makes it possible to minimize the shape memory effect of the PET without thereby eliminating it integrally.

The process consists in relieving the immobilized stresses so that the container tends to regain its initial shape, that of the preform, and therefore tends to regain a smaller volume. This is the particularly surprising and attractive approach of this invention. For this purpose, once the liquid is introduced when hot, then once the container is closed and a partial or total cooling is performed, the container is subjected to a rise in temperature of at least a portion of said container so as to relieve the stresses and to deform irreversibly the container on all or part of its surface.

The rise in temperature should be quick so as not to cause the rise in temperature of the liquid, which would cancel the necessary differential for compensating for the depression. Nevertheless, the selection of means for carrying out this rise in temperature remains very broad because the ratio of the weights put into play is very large. The few grams of PET of a container vs. hundreds of grams of the content necessarily lead to a faster temperature hike of the jacket than of the contents. In addition, in the case of heating by radiation in particular, the jacket is the first item that is subjected to infrared radiation and primarily absorbs the calories. It is suitable only for avoiding the means of heating by transmission, such as the water bath or pasteurization. In this case, it is another parameter that is no longer suitable: it is the time that is necessary, much too long with this type of technique.

Another prejudice to overcome is the compensation volume that is necessary. Considering the container after cooling, the deformation allows one to think that it is necessary to generate a significant volume reduction. For a 500 ml bottle, the volume reduction after cooling is 3.5% only of the liquid volume, therefore 17 ml. Actually, on such a bottle, generally about 60 mm of diameter to give an estimate, it is possible to provide the shrinkage on the so-called labeling height, i.e., in the zone for affixing a label.

The band between the labeling zone and the bottom as well as the shoulder zone being indeformable, it is sufficient to provide a retraction of 1 to 2 mm of the diameter. It is even possible to impose a slight overpressure to compensate for the possible additional shrinkage that may occur when such a container is put into the refrigerator. It should also be noted that during the hot filling, there is always an air-filled top space.

Also, it is possible to lay the bottle down so as to systematically direct this air along a generatrix of said bottle in the upper part. Actually, the process can implement hot-air heating because the transmission of calories between the wall and the air is very difficult, whereby the air is very insulating. The calories are concentrated in the wall of said bottle in the zone that is concerned and very quickly brings about the desired shrinkage. So as not to have to initiate a total raising of the temperature, it is also possible to carry out this heating of the jacket as soon as the interior liquid has passed below the transition temperature on the order of 40 to 50° C.

It is also possible to note that the process according to this invention makes it possible to produce contents of the square section, the shrinkage then causing a deformation of the container by triangulation, which is also compensated for during the relief of the stresses and during the shrinking of the container.

Thus, according to this invention, the process consists in using a container that can mechanically withstand, without deformation, hot filling of a liquid in a range of temperatures of a sterilized liquid, generally from 80 to 95° C., for example a polyethylene container, whereby said container is produced by extrusion/blow molding and has a shape memory before blow molding to fill said container with said hot liquid, to close this filled container, and to allow it to cool at least below a solidification temperature of the container, then bringing about a deformation by formation of a depression inside the container, then in heating the container to bring about a relief of the stresses and a return to the shape before blow molding that generates a shrinkage and an internal pressurization of the container that leads at least to compensating for the deformations undergone by the effects of depression.

Thus, according to this invention, a container that is filled with a pasteurized content, of which it is possible to guarantee the pasteurization by a simple filling temperature measurement, is obtained. The cost of the container for the implementation of the process is not detrimental since it is perfectly comparable to that of the containers that can undergo aseptic filling. The advantage is to be able to meet the manufacturers' requirements as regards filling rates and guaranteed asepsis without requiring high-investment bottling lines, also costly and complex in operation.

Thus, using the process according to this invention, not only is the cost of raw material for manufacturing a hot filled container reduced, but this lesser amount of raw material leads to subsequent reduced recycling costs for the same bottled volume.

According to this invention, it should be noted that it is possible to provide a suitable device for the implementation of the process. A solution consists in producing shells that comprise at least two parts so as to encase the container, whereby said shells are heated by any suitable means so as to release the necessary calories. The shells have a profile that approximately matches that of the container to release the calories close to the walls, and even in a localized zone of this wall, whereby these shells are oriented horizontally if the heating is carried out on a generatrix with air in the upper part. In this case, it is then possible to bring about a more intense heating in a particular zone.

What is claimed is:

1. A lightweight, thin-walled heat resistant plastic container containing hot-filled liquid contents, comprising:

a spout for filling the container with liquid contents;

a closure configured to seal the spout;

a base including a bottom portion that is bent toward the spout, the base including a structural reinforcement configured to withstand hydrostatic pressure from the hot-filling of liquid and configured to prevent significant deformation in the base upon the cooling of the hot liquid; and a sidewall extending upwardly from the base toward the spout, the sidewall including a zone of deformation, wherein the zone of deformation in the sidewall is configured to accommodate an initial deformation due to the cooling of the contents and to substantially regain its initial shape upon the relieving of immobilized stresses.

2. The container of claim 1, the container comprising PET.

3. The container of claim 1, wherein the container is cylindrical.

4. The container of claim 1, wherein the structural reinforcement prevents the base from protruding outwardly when said container is under slight pressure.

5. The container of claim 1, wherein the sidewall is devoid of vacuum panels.

6. The container of claim 1, wherein the zone of deformation is less mechanically resistant to pressure than other portions of the sidewall.

7. The container of claim 1, wherein the zone of deformation is configured to be reproducible on identical containers under similar conditions.

8. The container of claim 1, wherein, upon relieving of immobilized stresses, the contents have an internal pressure at least equal to external atmospheric pressure.

9. The container of claim 1, wherein the container weight is equivalent to that of a container of equal volume that is configured for a cold-fill aseptic process.

10. The container of claim 1, wherein internal pressure of the container increases, and both container internal volume and headspace decrease when the zone of deformation regains its initial shape.

11. The container of claim 1, wherein the relieving of immobilized stresses comprises the application of heat to the zone of deformation.

12. The container of claim 1, including a shoulder zone provided between the sidewall and the spout.

13. The container of claim 12, wherein the shoulder zone is configured to resist deformation.

14. A lightweight, thin-walled heat resistant plastic container containing hot-filled liquid contents, comprising:

a spout for filling the container with liquid contents;

a closure configured to seal the spout;

a base including a bottom portion that is bent toward the spout, the base including a structural reinforcement configured to withstand hydrostatic pressure from the hot-filling of liquid and configured to prevent significant deformation in the base upon the cooling of the hot liquid;

a sidewall extending upwardly from the base toward the spout; and a zone of deformation, which is configured to accommodate an initial deformation due to the cooling of the contents and to substantially regain its initial shape upon the relieving of immobilized stresses.

15. A lightweight, thin-walled heat resistant plastic container configured to receive hot-filled liquid contents, comprising:

a spout for filling the container with liquid contents;

a base including a bottom portion that is bent toward the spout, the base including a structural reinforcement configured to withstand hydrostatic pressure from the hot-filling of liquid contents and configured to prevent significant deformation in the base upon the cooling of such liquid;

a sidewall extending upwardly from the base toward the spout; and a zone of deformation, which is configured to accommodate an initial deformation due to the post-sealing cooling of hot-filled liquid contents, and the zone of deformation is configured to substantially regain its initial shape upon the relieving of immobilized stresses that manifest with the post-sealing cooling of hot-filled liquid contents.

* * * * *